(12) United States Patent
Bojeryd

(10) Patent No.: US 10,708,826 B2
(45) Date of Patent: *Jul. 7, 2020

(54) SELECTION OF A NETWORK ELEMENT

(71) Applicant: GUANGDONG OPPO MOBILE TELECOMMUNICATIONS CORP., LTD, Dongguan (CN)

(72) Inventor: Nils Bojeryd, Karlstad (SE)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/153,034

(22) Filed: Oct. 5, 2018

(65) Prior Publication Data

US 2019/0069203 A1    Feb. 28, 2019

Related U.S. Application Data

(63) Continuation of application No. 15/016,490, filed on Feb. 5, 2016, now Pat. No. 10,123,238, which is a
(Continued)

(30) Foreign Application Priority Data

Nov. 7, 2011  (EP) .................................... 11188040

(51) Int. Cl.
*H04W 36/00* (2009.01)
*H04W 60/00* (2009.01)
(Continued)

(52) U.S. Cl.
CPC ....... *H04W 36/0022* (2013.01); *H04W 60/00* (2013.01); *H04W 8/12* (2013.01); *H04W 36/14* (2013.01); *H04W 92/02* (2013.01)

(58) Field of Classification Search
CPC . H04W 36/00; H04W 36/0022; H04W 36/14; H04W 60/00; H04W 8/12; H04W 92/02
(Continued)

(56) References Cited

U.S. PATENT DOCUMENTS

2002/0107964 A1    8/2002  Tomoike
2008/0316980 A1   12/2008  Ahlen et al.
(Continued)

FOREIGN PATENT DOCUMENTS

WO    WO 2010052589        5/2010
WO    WO-2011009392 A1 *  1/2011  ........ H04W 36/0022

OTHER PUBLICATIONS

LteWorld, "Understanding CS Fallback in LTE", Posted on Sep. 27, 2009 by LteWorld in Blog, 3G, GSM, LTE, LteWorld.
(Continued)

*Primary Examiner* — Rownak Islam
(74) *Attorney, Agent, or Firm* — Finnegan, Henderson, Farabow, Garrett & Dunner, LLP

(57) ABSTRACT

A method for delivering information on a serving mobile switching centre server for an user equipment between a first communication network and a second communication network. The method includes a step of requesting an attachment of the user equipment to the second communication network by signaling between the user equipment and a network node of the second communication network, the signaling including at least part of information on the mobile switching centre server serving the user equipment in the first communication network. Additionally, an user equipment and a network node implementing the aspects of the method are described.

19 Claims, 4 Drawing Sheets

Related U.S. Application Data continuation of application No. 13/670,606, filed on Nov. 7, 2012, now Pat. No. 9,332,518.

(51) Int. Cl.
*H04W 36/14* (2009.01)
*H04W 8/12* (2009.01)
*H04W 92/02* (2009.01)

(58) Field of Classification Search
USPC ............................................. 370/331
See application file for complete search history.

(56) References Cited

U.S. PATENT DOCUMENTS

| | | | |
|---|---|---|---|
| 2009/0082023 | A1 | 3/2009 | Gustavsson |
| 2009/0213834 | A1 | 8/2009 | Amirijoo et al. |
| 2010/0135250 | A1 | 6/2010 | Ishii et al. |
| 2010/0189035 | A1 | 7/2010 | Pehrsson et al. |
| 2010/0260105 | A1 | 10/2010 | Keller et al. |
| 2010/0322189 | A1 | 12/2010 | Qiang |
| 2010/0323695 | A1 | 12/2010 | Kallio et al. |
| 2011/0021216 | A1 | 1/2011 | Pudney et al. |
| 2011/0317544 | A1 | 12/2011 | Chou |
| 2012/0122459 | A1* | 5/2012 | Wu ............... H04W 36/0022 455/437 |
| 2012/0170548 | A1 | 7/2012 | Rajagopalan et al. |
| 2013/0028183 | A1* | 1/2013 | Praquin ............... H04W 76/16 370/328 |
| 2013/0095834 | A1 | 4/2013 | Hou et al. |

OTHER PUBLICATIONS

European Search Report, dated Apr. 10, 2012, from corresponding European application.

'Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 versions 10.5.0 Release 10) , Technical Specification, European Telecommunications Standards Institute (ETSI), vol. 3GPP SA 2, No. V10.5.0, Oct. 1, 2011.

3GPP: "3rd Generation Partnership Project; Technical Specification Group Services and System Aspects; General Packet Radio Service (GPRS) enhancements for Evolved Universal Terrestrial Radio Access Network (E-UTRAN) ccess (Release 10)", 3GPP Draft; 23401-A50 CRS Implemented, 3rd Generation Partnership Project (3GPP), Mobile Competence Centre, vol. SA WG2, Aug. 24, 2011.

'3rd Generation Partnership Project; Technical Specification Group Services and Systems Aspects; Intra-domain connection of Radio Access Network (RAN) nodes to multiple Core Network (CN) nodes (Release 10) , 3GPP Standard; 3GPP TS 23.236, 3rd Generation Partnership Project (3GPP), Mobile Competence Centre; No. V10.2.1, Jan. 4, 2011.

* cited by examiner

SELECTION OF A NETWORK ELEMENT

This is a continuation of U.S. application Ser. No. 15/016,490, filed Feb. 5, 2016, which is a continuation of application Ser. No. 13/670,606, filed Nov. 7, 2012, now U.S. Pat. No. 9,332,518, which claims priority from European Application No. 11188040.7, filed Nov. 7, 2011. The entire contents of all of the aforementioned applications are incorporated herein by reference.

TECHNICAL FIELD

The invention concerns in general the technical field of wireless communication systems. More specifically, the invention concerns delivery of information relating to a serving network node between wireless communications networks implementing different access technologies.

BACKGROUND OF THE INVENTION

The evolution of wireless communications has resulted in an increase of networks of different technologies and corresponding different air interfaces. As a result, during the course of a single call, a wireless user equipment (UE) may roam among multiple radio access networks (RANs), wherein each such RAN implements a different technology to the other RANs of the multiple RANs, for example, a second generation (2G) and a third generation (3G) circuit switched RAN, such as a GSM (Global System for Mobile communications) network and WCDMA (Wideband Code Division Multiple Access) providing primarily circuit voice service, and a packet data RAN, such as a later generation 3GPP LTE (Third Generation Partnership Project Long Term Evolution) network. As the UE roams among the circuit switched RAN and the packet data RAN providing packet data services, it may be beneficial to system performance to handover the UE between the circuit switched RAN and the packet data RAN for example due to fact that channel conditions associated with the latter RAN may be more favorable than the channel conditions associated with the former RAN. By way of another example, an operator of both a legacy circuit network and a packet data network may desire to move the UE from one such network to the other network for purposes of system load balancing.

In order to offer a successful roaming experience to the user the UE/user needs to register with the new network to receive services that require registration. This registration process is described as Network Attachment. The attach procedure comprise inter alia some signaling relating to identification of the UE and network elements relating to service, security related issues, location update related signaling, bearer(s) allocation for the UE and IP address allocation, for example. FIG. 1 illustrates an E-UTRAN initial attach procedure according to 3GPP specification TS 23.401 V10.5.0 (2011-09) in LTE (E-UTRAN). The procedure illustrated in FIG. 1 is only for background purposes for increasing the understanding, what kind of process is performed when UE attaches to LTE network.

As already indicated, LTE technology is primarily supporting packet based services only. However, current services in the GSM/WCDMA networks are mainly based on circuit switched (CS) technology. An example of such a service is voice communication. It is noticed that as long as the services based on either packet based or CS technology co-exist, there is need to support the functionality of the service in all networks. One idea to support circuit switched services in LTE network is known as a term CS fallback. CS tailback supports e.g. voice services and traditional CS domain services (e.g. SMS) for LTE and the idea behind the term is to reuse the GSM/WCDMA network resources for implementation of the mentioned services also in LTE. In practice this means that to implement CS fallback functionality in LTE, all participating elements i.e. UE, MME, MSC and E-UTRAN needs to support it.

FIG. 2 illustrates interfaces between different network elements in different networks. In order to enable the CS tailback functionality into the network a new interface SGs is added in LTE architecture. SGs also includes short message service (SMS) functionality comprising SMS without CS fallback. The interface is the reference point between the Mobility Management Entity (MME) in LTE and Mobile Switching Centre server (MSC Server or MSS). SGs interface is used for the mobility management and paging procedures between packet switched and circuit switched domains, and is based on the Gs interface procedures, which is known from GSM/WCDMA.

In view of the current invention it is important to understand that for enabling CS fallback to operate the UE must register on both the LTE and GSM/WCDMA networks to insure that both networks are aware of its presence and location. The UE does not have to perform two registration procedures, because LTE MME performs the registrations into both networks, when the UE attaches to the LTE network. The registration on the GSM/WCDMA network is performed in context of location update over the SGs interface to the MSC in GSM/WCDMA network.

One benefit of CS fallback is that it extends the life of the GSM/WCDMA network by enabling CS services, such as voice, for the LTE. Thus, e.g. telecom operators can get their investments worth, since the existing network infrastructure can be utilized longer. Another benefit is that CS tailback provides complete service and feature transparency with the GSM/WCDMA because the LTE subscriber is redirected to the GSM/WCDMA network for all CS services.

The drawback of the CS tailback solution in general is that it causes heavy signaling between the networks. Additionally, the CS fallback operation may take a while to be established due to signaling and also for Quality of Service measurements if needed. This may be noticed by the user.

One special case in CS tailback is that a user residing in LTE network (UE attached to LTE) wants to start CS based service, e.g. a voice call. In such a case UE sends a service request with the CS tailback indicator to the MME. The request indicates that MME shall establish a CS tailback. MME requests the radio part (eNode B) of LTE redirect the mobile device to the GSM/WCDMA network. In order to achieve the redirection on a radio layer the core network shall be controlled in such a way that it can take the responsibility of the connection management. One important part of this is that there shall be a MSC server dedicated for the UE for CS tailback situation. According to the current practice a MSC server is randomly selected by the serving MME from a pool of MSC servers according to a predefined algorithm (IMSI hash algorithm) when the UE enters to the LTE coverage. This happens e.g. when the UE moves from GSM/WCDMA radio coverage to LTE radio coverage. The problem with this approach is that by selecting a MSC server randomly one needs to deliver subscriber information between different nodes as well as other information like location information. This, in turn, requires signaling between different network nodes as well as may end up unbalanced load between different MSC servers. This is also unnecessary in a sense that when UE is moving from GSM/WCDMA to LTE, it already has a dedicated MSC server in GSM/WCDMA, which comprises all necessary information relating to that specific UE.

The above described random selection of MSC happens also within SGSN based MSC selection due to the fact that MSC Selection algorithm is consistent between SGSNs and MMEs for so called combined registrations over Gs and SGs interfaces. However, when a SGSN or a MME performs a MSC selection there is no consistency with a previous selection made for a UE that was registered via GERAN or RAN access. The inconsistency leads to signaling traffic and thus to unnecessary load to the networks, as already indicated.

More specifically, the root cause of the mismatch is that the selection that is performed via RAN and GERAN uses TMSI, as the NRI within the TMSI is the basis for the MSC Server Selection (in case of RAN, the UE masks the relevant bits in the TMSI to construct the Intra Domain NAS Node Selector (IDNNS), and in the case of GERAN the SSC uses the TMSI itself), but for combined attach the "IMSI hash" is the basis for MSC Server selection.

At least currently, LTE radio coverage is often limited which causes the CS tailback (CSFB) User Equipment to register to a Public Land Mobile Network (PLMN) via GERAN. A typical case where location registration will be performed using Location Updating, an MSC Server will be selected, and the MSC Server will allocate a TMSI with an NRI identifying the selected MSC Server. The NRI is subsequently re-used to identify the MSC Server, and the same NRI is used at TMSI re-allocation, as long as the UE stays in the MSC Pool area. As long TMSI based Location Updating is used the same MSC Server is kept.

Considering that TMSI are allocated by different PLMNs and that in some cases the NRIs will match Core Network nodes between networks and sometimes will be subject to load balancing between the Core nodes, the UEs in the Core Network will be distributed over the MSC Servers in the pool not based on IMSI but on TMSI, even as historically there has to have been an MSC selection performed using IMSI of the USIM.

In the case where the UE is CS tailback capable and detects LTE radio coverage it will perform combined EPS/IMSI attach or combined tracking area updating procedures, and the MME will select a MSC Server for the UE. The same will apply if the UE changes Radio Access Technology where the new RAT offers NMO=1 (Network Mode of Operation), and the old RAT offers a different NMO. In general, NMO is used to indicate if the registration of the UE to the MSC and SGSM is combined (NM0=1) or independent (NM0=2). In NMO=1 the SGSN selects the MSC Server with IMSI hash function.

Subsequent to the MME or SGSN selecting a new MSC Server for the User Equipment, the MSC Server does not change again as long as the UE doesn't change pool areas or re-selects PLMN, as the TMSI and NRI is allocated by the new MSC Server (barring load rebalancing).

Roaming CS tailback subscribers will cause MSC re-selection in the Visited Public Land Mobile Network (VPLMN) to be performed more frequently as those UEs are subject to performing PLMN re-selection. Previously roaming subscribers returning to the Home Public Land Mobile Network (HPLMN) will be allocated to the same MSC Server as previously if the NRI within the TMSI has not been changed by the remote network, but to a new MSC Server in other cases. For those UEs, an additional change of MSC Server will occur when the CS fallback User Equipment enters LTE coverage.

The change of MSC Server in the combined registration case is sub-optimal, and in case of network disturbances or overload, it may delay the recovery of the network. The case where the complete PS domain or EPS is unavailable for a period of time, may lead to further instability in the CS domain when the PS domain or EPS recovers, due to extra signaling load for inter-MSC mobility.

However, the current 3GPP specification TS 23.236 V9.0.0 does not offer a way to select MSC for CS tailback purposes. More precisely, there is no way to deliver information on the serving node between different networks for such a purpose that the new network may need that information in certain situations when offering service to the UE.

SUMMARY OF THE INVENTION

An objective of the invention is to present a method and an user equipment and a network node for minimizing signaling load on the network. Another objective of the invention is that the method and the user equipment and the network node enables balancing the subscriber load over a number of network nodes.

The objectives of the invention are achieved by introducing a novel method for managing the subscriber information in networks with different communications technologies. More precisely, the objectives of the invention are achieved by minimizing the signaling on the network by delivering information relating to serving network elements in a communication network between the network elements belonging to different communication technologies.

Some aspects of the invention relate to a method for delivering information on a serving mobile switching centre server for an user equipment between a first communication network and a second communication network. The method comprises a step of requesting an attachment of the user equipment to the second communication network by signaling between the user equipment and a network node of the second communication network, the signaling comprising at least part of information on the mobile switching centre server serving the user equipment in the first communication network.

Some aspects of the invention relate to an idea that the information on the mobile switching centre server serving the user equipment in the first communication network is embedded in the TMSI information in the signaling. For example, the NRI field of the TMSI information can be utilized.

Some aspects of the invention introduce that the NRI field comprising information on the mobile switching centre server serving the user equipment in the first communication network is configured to be unspecified. Some additional aspects of the invention presents that the NRI field comprising information on the mobile switching centre server serving the user equipment in the first communication network is configured to be arbitrary length, up to 10 bits.

Some aspects of the invention teach that the delivery of information is performed over SGs interface.

Some additional aspects of the invention disclose that the information on the mobile switching centre server serving the user equipment in the first communication network is stored in a network node of the second communication network.

Further aspects of the invention say that the requesting of attachment is delivered in response to quality of service measurement implemented by the user equipment.

Additionally, some aspects of the invention illustrate that the location update procedure of the user equipment is performed at least to the mobile switching centre server indicated in the attach request by the network node.

Some aspects of the invention disclose that the full information of the mobile switching center is composed from a multiple attach request, each of the requests comprising at least part of the information on the mobile switching centre server serving the user equipment in the first communication network Some aspects of a user equipment comprising a processor and at least a memory comprising software to be executed by the processor for creating instructions introduce that the user equipment is configured to insert at least part of information on a mobile communication centre server serving the user equipment in a first communication network to a request for attaching the user equipment to a second communication network, the request to be delivered to a network node residing in a second communication network over a signaling layer. Further, the user equipment according to some aspects of the invention is configured to divide the information on the serving mobile communication centre server into multiple attach requests.

Some aspects of the invention relate to a network node comprising a processor and at least a memory comprising software to be executed by the processor for creating instructions disclose that the network node residing in a second communication network is configured to derive at least part of information on a mobile communication centre server serving an user equipment in a first communication network from an attach request delivered by the user equipment to the network node over a signaling layer. Furthermore, the network node according to some aspects of the invention is configured to compose information on the mobile communication centre server serving the user equipment in the first communication network from a multiple attach requests.

A method according to the invention is characterized by the steps recited in the characterizing part of the independent claim directed to a method.

An user equipment according to the invention is characterized by the features recited in the characterizing part of the independent claim directed to a device.

A network node according to the invention is characterized by the features recited in the characterizing part of the independent claim directed to a system.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

Figure 2:
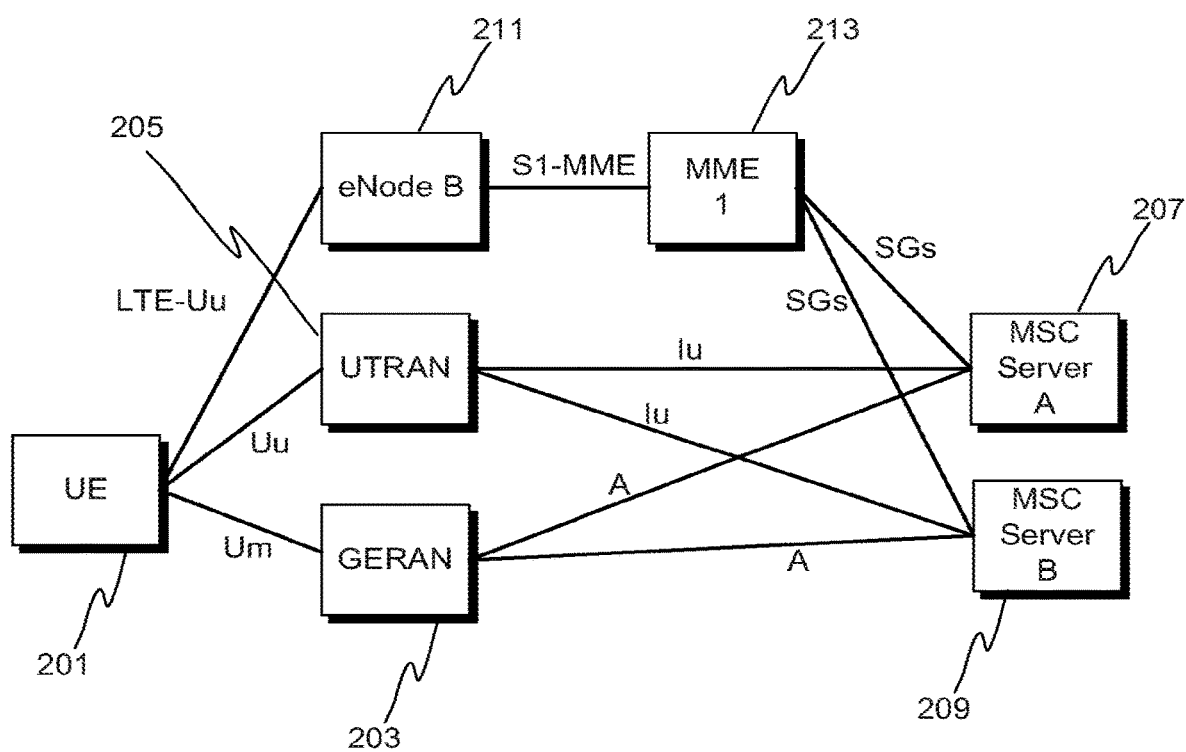
FIG. 2 illustrates interfaces between different network elements in different networks.

An exemplary embodiment of the invention is now described by first referring to FIG. 2 discussed shortly earlier. The user equipment UE 201 comprises means for interacting with different communications technologies, such as GSM and/or WCDMA and LTE. Thus, UE 201 is able to be in connection to GERAN (GSM EDGE Radio Access Network) over Urn interface. Alternatively or in addition, the UE 201 is able to be in connection to UTRAN (Universal Terrestrial Radio Access Network) over Uu. Furthermore, the UE 201 comprise means for being interaction with the radio access network elements of LTE technology i.e. eNode B 211 over LTE-Uu interface. Both the GERAN and UTRAN are controlled by MSC server over either interface A for GERAN 203 or interface Iu for UTRAN 205. Interface Iu between UTRAN and MSC Servers is especially meant for CS service purposes.

FIG. 2 illustrates two MSC servers A 207 and B 209. Moreover, the LTE radio access network elements eNode B 211 are controlled by Mobility Management Entity 213 over S1-MME interface. It is to be noted that LTE network comprises multiple MMEs even if FIG. 2 illustrates only one element. In order to manage connections and roaming aspects of UEs an interface SGs is configured to enable signaling between MME 213 and MSC 207; 209.

Figure 3:
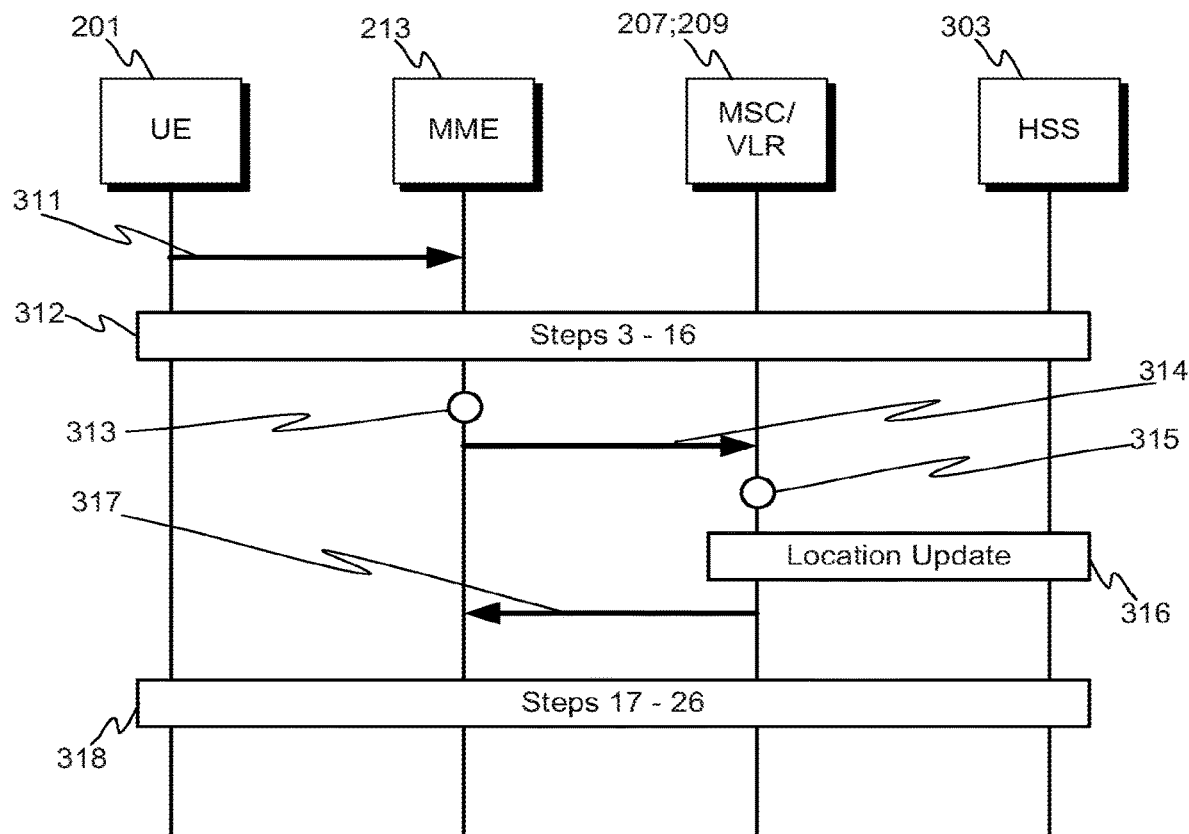
FIG. 3 illustrates a flow chart relating to the method according to an embodiment of the invention.

The invention is now discussed by referring to an attach procedure described in FIG. 3. The situation as illustrated in FIG. 3 is that UE 201 is moving from GSM/WCDMA network coverage to LTE coverage and it is decided that the UE 201 shall be served by LTE network. This can result e.g. from Quality of Service measurements implemented by the UE 201, for example. The attach procedure illustrated in FIG. 3 is especially meant for CS fallback situation i.e. how information necessary for CS fallback is delivered from LTE network to GSM/WCDMA network in order to have necessary support for CS connection in place if there is a need to offer circuit switched service to the UE 201.

More precisely, FIG. 3 illustrates the signaling between different entities of GSM/WCDMA and LTE networks. The network elements, in addition to the network terminal UE, involved in the attach procedure are MME 213, MSC/VLR 207; 209 and Home Subscriber Server (HSS) 303, which is a master user database supporting network entities which handle the calls. HSS 303 contains the subscription-related information (i.e. subscriber profiles), performs authentication and authorization of the user, and can provide information about the subscriber's location and IP information. HSS 303 performs similar tasks to the GSM Home Location Register (HLR) and Authentication Centre (AuC). It is illustrated only those elements here, which relate to attach procedure especially for enabling CS fallback in such a way that signaling can be minimized.

The attach procedure initiates with an attach request 311 delivered by an UE 201 to eNode B 211 and further to the MME 213 serving the eNode B 211. The attach request message comprises multiple type of information, i.e.
- International Mobile Subscriber Identity (IMSI) or old Globally Unique Temporary Identity (GUTI)
- Old GUTI type
- last visited Tracking Area Identity (TAI) (if available)
- UE Core NetworkCapability
- UE Specific Discontinuous Reception (DRX) parameters
- Attach Type
- Evolved Session Management (ESM) message container (Request Type, PON Type. Protocol Configuration Options, Ciphered Options Transfer Flag)
- Key identifier $KSI_{AsME}$ for authenticating UE SIM/USIM
- Non-access stratum (NAS) sequence number
- NAS-MAC
- additional GUTI
- P-Temporary Mobile Subscriber Identity (TMSI) signature for packet domain service in GSM and WCDMA
- Voice domain preference for prioritizing voice or dataservice
- UE's usage setting
- MS Network Capability In addition to the attach request message also RRC parameters indicating the Selected Network and the old GUMMEI Globally Unique MME Identifier. For CS tailback purposes the Attach Type information in the attach request message indicates that the UE requests a combined EPS/IMSI attach and informs the network that the UE is capable and configured to use CS fallback and/or SMS over SGs interface.

According to the invention a new information element is added to the above described attach request. More specifically, information on the MSC server 207; 209, which is serving the UE 201 in GSM/WCDMA network, is delivered along the attach request 311 to a network node in LTE network. According to an embodiment of the invention an information element MS Identity is added to the signaling carried out over SGs interface. The MS Identity is configured to be a new identifier comprising Temporary Mobile Subscriber Identity (TMSI) comprise information on the MSC server 207; 209, which is serving the UE in the GSM/WCDMA network. More precisely, information on the MSC server 207; 209 is embedded to a Network Resource Identifier (NRI) field of the TMSI information according to the embodiment of the invention. MS Identity comprising TMSI is a new information element added to attach request. It shall not be mixed with P-TMSI described above due to the fact that TMSI according to the invention comprises a NRI field indicating MSC server, but P-TMSI comprises a NRI field pointing out SGSN (Serving GPRS serving node) in a SGSN pool. Thus, P-TMSI is outside of the scope of the current invention.

Generally speaking, TMSI is the identity that is sent between the UE and the network assigned by MSC/VLR to every UE within the area. Key use of the TMSI is in paging the mobile within the network. Thus, one of the inventive aspects of the current invention is that the TMSI comprises an information field called NRI, which is not specified, but it is still part of the TMSI. Thus, by including TMSI in the attach request it does not require any further modification to the system. The only need for the NRI is to be parsed from the TMSI in the same way as the NRI is parsed from the TMSI in the GERAN radio network in order to being able to derive information on the MSC server embedded in the NRI field. The User Equipment is not aware, which part of the TMSI is used for the NRI, so the UE cannot identify the NRI.

The MME receiving the attach request is configured to analyze the received request signaling and deriving delivered MSC server information from the request. In response to derivation of MSC server information from the attach request the network node, e.g. MME, may store the information to its memory according to an embodiment of the invention.

Figure 1:
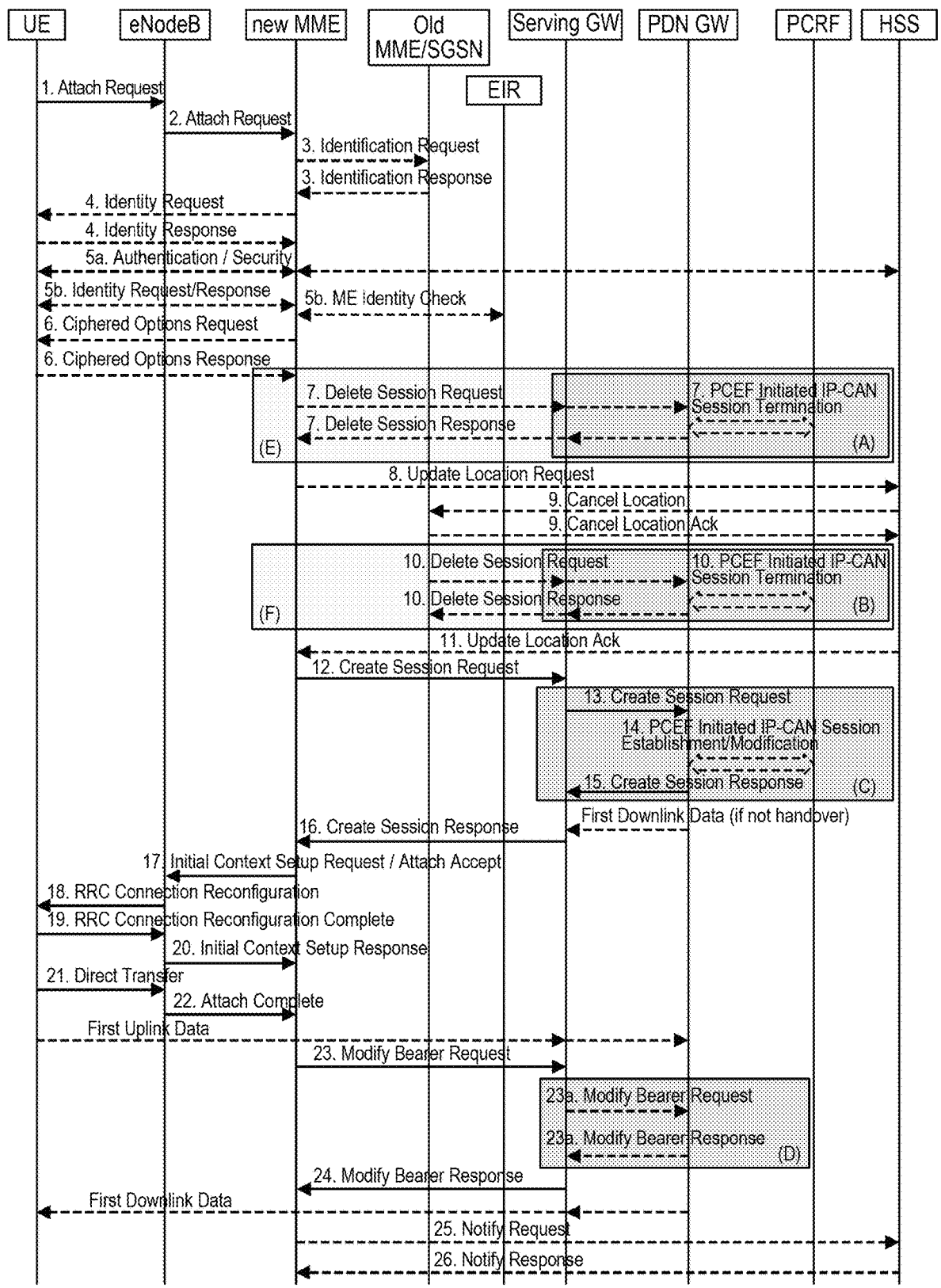
FIG. 1 illustrates an E-UTRAN attach procedure according to a 3GPP specification.

The next phase 312 of the attach procedure for confirming the CS tailback comprises the similar steps from 3 to 16 as described in FIG. 1. Since they do not have any impact to the invention they need not to be discussed here.

In phase 313 the MME 213 is configured to derive Visitor Location Register (VLR) number based on the NRI value the MME 213 has stored for the MSC/VLR. The VLR is a database of the subscribers who have roamed into the area of the MSC (Mobile Switching Center) which it serves. In response to the derived VLR number the MME 213 starts location update procedure towards the MSC/VLR 207; 209, which serves the UE 201 currently, by sending a location update request 314 to the MSC/VLR 207; 209. An interface SGs is associated 315 between the MME 213 and the MSC/VLR 207; 209, which is currently serving the UE 201 in GSM/WCDMA. Furthermore, as normal the location update 316 in CS domain is configured to be established by MSC 207; 209 and the HSS 303. The location update is confirmed to MME 213 with an acceptance signaling 317. Finally, the attach procedure is finalized 318 according to steps from 17 to 26 as illustrated in FIG. 1, which are not discussed here.

Figure 4:
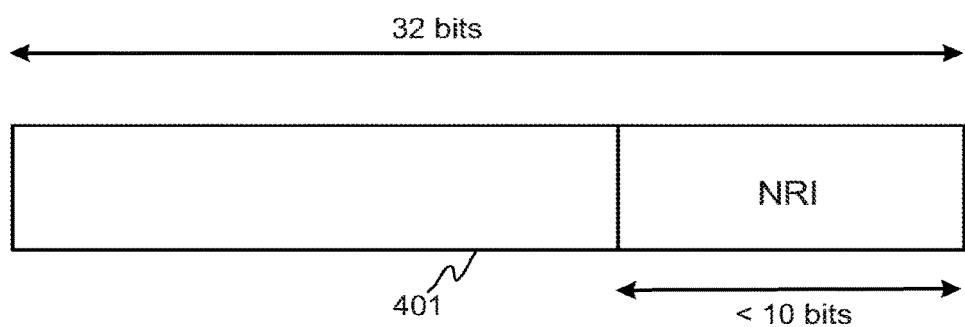
FIG. 4 illustrates a structure of a data element according to an embodiment of the invention.

As disclosed, information on the MSC server 207; 209, which is serving the UE 201, is delivered in the attach request. More precisely, the information is delivered in TMSI. FIG. 4 illustrates the structure of TMSI 401. TMSI 401 is an identifier with a length of 32 bits. The NRI is a part of the TMSI 401. It is not fixed length, but the maximum length is 10 bits. The utilization of NRI field in TMSI 401 is based on the fact that one or more specific NRI is assigned to every MSC. One of these specific NRIs is part of every temporary identity TMSI 401 which the MSC assigns to an UE. The location of bits indicating the MSC identity may be agreed beforehand, but it is advantageous to leave the structure unspecified to allow the flexibility in the system. For example, according to an embodiment of the invention the MSC server may be identified as an index of 4 bits, identifying null which is spare, and MSC Servers 1 through 15. This index is called the NRI. The NRI can, however, be of an arbitrary length, up to 10 bits. The length depends at least on the implementation of the network i.e. how many MSC Servers are needed to cover the management of the radio access network and/or UEs. In addition to NRI field the TMSI may comprise other information fields such as VLR restart field. The TMSI structure is modifiable.

As can be concluded from the description above the method according to an embodiment of the invention minimizes the signaling required for enabling the CS fallback. This is achieved by transferring information relating to MSC server, which is serving the UE in GSM/WCDMA network connections, to MME of LTE network in attach request for LTE network. As a result, the MME does not have to assign a randomly selected MSC server for the UE attached to it. As a result, there is no need for additional signaling when assigning MSC server or in the context of location update.

According to some other embodiment of the invention only part of the information on the mobile switching centre server serving the user equipment in the first communication network is delivered in the attach request from UE to MME via the radio access network. Thus, an attach request comprises at least part of the information on the MSC server, which is serving the UE in GSM/WCDMA network. As a result information on the MSC server, which is serving the UE in GSM/WCDMA network, can be transmitted in one or more attach requests. The MME is configured to compose the full information of the MSC server, which is serving the UE in GSM/WCDMA network, from multiple attach requests.

In the description of the invention it has been referred to delivering information on the MSC server, which is serving UE in GSM/WCDMA network, to the MME. The same inventive idea is applicable in delivering information on the MSC server, which is serving UE in GSM/WCDMA network, to the SGSN using the Gs interface in place of the SGs interface, and using the NRI within the TMSI accordingly. Gs is the interface between the SGSN and MSC server elements. The delivery of the information on the MSC server, which is serving the UE, to the SGSN, is important according to the invention due to the fact that by means of this one can prevent the re-selection of MSC server by SGSN in case of NMO=1. SGSN is not illustrated in FIG. 2 for clarity reasons.

Figure 5:
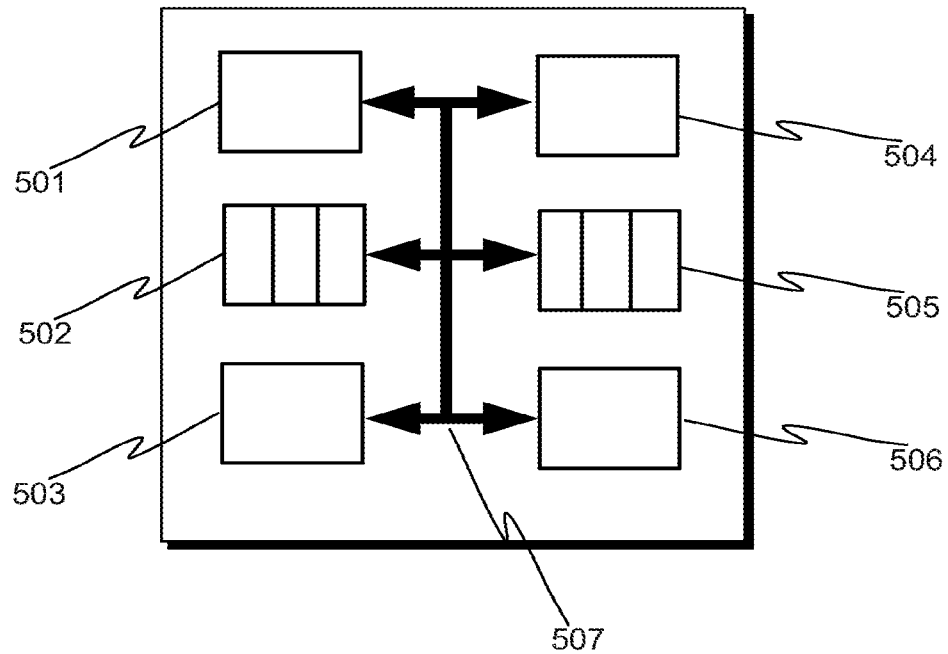
FIG. 5 illustrates an user equipment according to an embodiment of the invention.

The invention also relates to the user equipment UE. According to an embodiment of the invention the UE comprises a processing component that is capable of executing instructions related to the actions described above. FIG. 5 illustrates an example of a UE that comprises a processing component 501 suitable for implementing one or more embodiments disclosed herein. In addition to the processor 501 (or Central Processor Unit: CPU), the UE may comprises network connectivity elements 502, random access memory (RAM) 503, read only memory (ROM) 504 and input/output (I/O) devices 505. Additionally, the UE may comprise a smart card 506, such as SIM and/or USIM, for storing network-specific information used to authenticate and identify subscribers on the network. These components may communicate with one another via a bus 507. In some cases, at least some of these components can locate in a single physical entity or in more than one physical entity.

The processor 501 is configured to execute instructions, codes computer programs or scripts, which can be accessed via network connectivity elements 502, or from RAM 503, ROM 504 or smart card coupled to UE 506. While only one processor is disclosed in FIG. 5, multiple processors may be present.

The network connectivity elements may comprise e.g. modems, Ethernet devices, universal serial bus (USB) interface devices, wireless local area (WLAN) devices, radio transceiver devices, such as GSM radio transceiver devices, WCDMA radio transceiver devices and/or LTE radio transceiver devices. The network connectivity elements may enable the processor to communicate with the corresponding telecommunication networks or Internet or other networks.

The RAM can be used to store volatile data and instructions that are executed by the processor. The ROM is a non-volatile memory and it is used to store instructions and perhaps data that are read during execution of instructions.

The 1/0 devices may include displays, touch screen displays, keyboards, keypads, switches, mice, track balls, voice recognizers, card readers, or other known 1/0 devices.

According to an embodiment of the invention the UE comprises software stored in the memory elements and executed by the processor to detect the need for attaching to a new network. The detection can be a result of execution of channel measurements in order to maintain connectivity to the most appropriate network in an area. If a need changing from a first telecommunication network, such as GSM or WCDMA, to a second network, such as LTE, is detected, the UE is configured to compose a attach request signaling for LTE network. The composing of the request comprises a step of inserting at least part of the information on the MSC server, which serves it in GSM and/or WCDMA network, into the request. Thus, the processor is instructed to derive information on the serving MSC in GSM and/or WCDMA from TMSI information, which is the identity that is sent between the UE and the network, and insert that into the attach request. More specifically, the memory elements of UE comprise instructions to insert at least part of the information on the MSC server serving UE in GSM and/or WCDMA into the TMSI information element, and especially into the NRI field. Furthermore, the UE is configured to deliver the attach request to the MME in LTE network via eNode B. The LTE-Uu interface between UE and eNode B and S1-MME interface between the eNode B and MME are utilized in the signaling. The connectivity elements of the UE are configured to implement a corresponding interface, such as LTE-Uu, towards the network nodes, such as eNode B. If the UE composes an attach request comprising only part of the information on the serving MSC server, the UE is configured to detect this and compose multiple attach requests, each comprising at least part of the information. The full information is configured to be delivered over the signaling.

According to an embodiment of the invention the above described implementation of MSC server information delivery by the UE is performed by means of the processor and software comprising instructions for implementing it when the software is executed by the processor of the UE.

Figure 6:
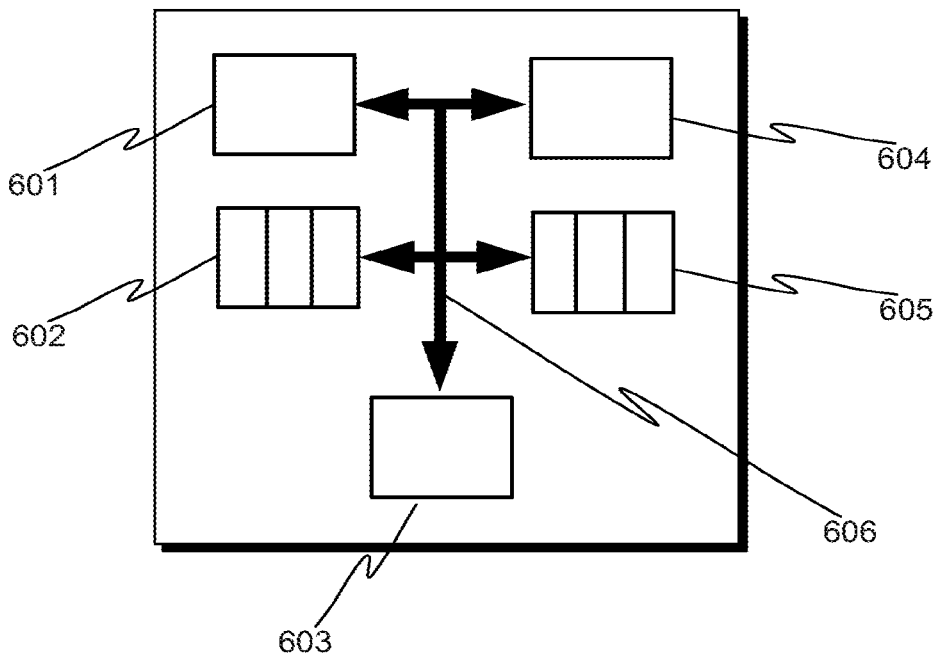
FIG. 6 illustrates a network element according to an embodiment of the invention.

Correspondingly, according to an embodiment of the invention a network node being a counterpart in the communication to the UE, such as the MME, comprises a processing component that is capable of executing instructions related to the actions described above. FIG. 6 illustrates an example of a MME that comprises a processing component 601 suitable for implementing one or more embodiments disclosed herein. In addition to the processor 601 (or Central Processor Unit; CPU), the MME may comprises network connectivity elements 602, random access memory (RAM) 603, read only memory (ROM) 604 and input/output (1/0) devices 605. These components may communicate with one another via a bus 607. In some cases, at least some of these components can locate in a single physical entity or in more than one physical entity.

The processor 601 is configured to execute instructions, codes computer programs or scripts, which can be accessed via network connectivity elements 602, or from RAM 603 or ROM 604. While only one processor is disclosed in FIG. 6, multiple processors may be present.

The network connectivity elements may comprise e.g. modems, Ethernet devices, universal serial bus (USB) interface devices, wireless local area (WLAN) devices, radio transceiver devices, such as GSM radio transceiver devices, WCDMA radio transceiver devices and/or LTE radio transceiver devices. The network connectivity elements may enable the processor to communicate with the corresponding telecommunication networks or Internet or other networks over the known interfaces. For example, the network connectivity elements of MME are configured to implement S1-MME interface towards eNode B and SGs interface towards one or more MSC servers.

The RAM can be used to store volatile data and instructions that are executed by the processor. The ROM is a non-volatile memory and it is used to store instructions and perhaps data that are read during execution of instructions.

The I/O devices may include displays, touch screen displays, keyboards, keypads, switches, mice, track balls, voice recognizers, card readers, or other known I/O devices.

According to an embodiment of the invention the MME comprises software stored in the memory elements and executed by the processor to detect a attach request over signaling layer from a UE delivered via eNode B or SGSN. The processor when executing the software is configured to analyze the received attach request and derive TMSI information from the request. Furthermore the MME is configured to derive NRI information inside the TMSI and especially to derive at least part of information on a MSC server, which is serving the UE in a network from which the UE is attaching to LTE network. In response of detecting and deriving the information on the MSC server, the MME is configured to store the appropriate information from the attach request into its memory according to an embodiment of the invention. Thus, the MME is configured to perform location update procedure towards the MSC/VLR. Especially, in a CS fallback situation the MME is configured to check the MSC information from its memory and implement the CS connection by means of the MSC. If the network node detects that only part of the information on a mobile communication centre server serving an user equipment in a first communication network is delivered in a single attach request, the network node is configured to compose the full information on the mobile communication centre server serving the user equipment in the first communication network from a multiple attach requests.

According to an embodiment of the invention the above described implementation of MSC server information delivery to MME is performed by means of the processor and software comprising instructions for implementing it when the software is executed by the processor of MME or any other processing means serving the MME.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. For example, the terminology GSM/WCDMA in the description is to be understood in such a manner that it indicates only GSM network or only WCDMA network or both of the networks.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed:

1. A method for performing a circuit-switched fallback, comprising:
   sending, by a user equipment to a network node residing in a first communication network, information indicating an identity of a mobile switching center server serving the user equipment in a second communication network; and
   receiving by the user equipment, in a fallback situation, a fallback service from the second communication network via the mobile switching center server selected by the network node based on the sent identity of the mobile switching center server.

2. The method of claim 1, wherein the information indicating the identity of the mobile switching center serving the user equipment in the second communication network is included in an attach request from the user equipment.

3. The method of claim 2, wherein the information indicating the identity of the mobile switching center serving the user equipment in the second communication network is embedded in temporary mobile subscriber identity (TMSI) information in the attach request.

4. The method of claim 2, wherein the attach request is delivered in response to a quality of service measurement implemented by the user equipment.

5. The method of claim 1, wherein the network node sends a location update request to the selected mobile switching center in the second communication network.

6. The method of claim 1, wherein the fallback service includes a voice service.

7. The method of claim 1, wherein the fallback service includes a short message service (SMS) service.

8. The method of claim 1, wherein the first communication network includes a Long Term Evolution (LTE) network, and the second communication network includes a Global System for Mobile communications (GSM) network or a Wideband Code Division Multiple Access (WCDMA) network.

9. The method of claim 1, wherein the network node includes a Mobility Management Entity (MME).

10. A user equipment, comprising:
    a memory that stores a set of instructions; and
    one or more processors configured to execute the set of instructions to cause the user equipment to:
    send, to a network node residing in a first communication network, information indicating an identity of a mobile switching center server serving the user equipment in a second communication network; and
    receive, in a fallback situation, a fallback service from the second communication network via the mobile switching center server selected by the network node based on the sent identity of the mobile switching center server.

11. The user equipment of claim 10, wherein the information indicating the identity of the mobile switching center in the second communication network is included in an attach request from the user equipment.

12. The user equipment of claim 11, wherein the information indicating the identity of the mobile switching center in the second communication network is embedded in temporary mobile subscriber identity (TMSI) information in the attach request.

13. The user equipment of claim 11, wherein the attach request is delivered in response to a quality of service measurement implemented by the user equipment.

14. The user equipment of claim 10, wherein the network node sends a location update request to the selected mobile switching center in the second communication network.

15. The user equipment of claim 10, wherein the fallback service includes a voice service.

16. The user equipment of claim 10, wherein the fallback service includes a short message service (SMS) service.

17. The user equipment of claim 10, wherein the first communication network includes a Long Term Evolution (LTE) network, and the second communication network includes a Global System for Mobile communications (GSM) network or a Wideband Code Division Multiple Access (WCDMA) network.

18. The user equipment of claim 10, wherein the network node includes a Mobility Management Entity (MME).

19. A non-transitory computer-readable storage medium having stored therein instructions that are executable by one or more processors of a user equipment to cause the user equipment to perform a method for selecting a mobile switching center server, the method comprising:
- sending, by the user equipment to a network node residing in a first communication network, information indicating an identity of the mobile switching center server serving the user equipment in a second communication network; and
- receiving by the user equipment, in a fallback situation, a fallback service from the second communication network via the mobile switching center server selected by the network node based on the sent identity of the mobile switching center server.

\* \* \* \* \*